(12) United States Patent
Dinwiddie et al.

(10) Patent No.: US 7,568,208 B1
(45) Date of Patent: Jul. 28, 2009

(54) METHOD AND APPARATUS FOR USING A SINGLE PASSWORD SET IN AN INTEGRATED TELEVISION SYSTEM

(75) Inventors: Aaron Hal Dinwiddie, Cicero, IN (US); David Johnston Lynch, Carmel, IN (US)

(73) Assignee: Thomson Licensing, Boulogne Billancourt (FR)

( * ) Notice: Subject to any disclaimer, the term of this patent is extended or adjusted under 35 U.S.C. 154(b) by 689 days.

(21) Appl. No.: 10/031,151

(22) PCT Filed: Jul. 12, 2000

(86) PCT No.: PCT/US00/18950

§ 371 (c)(1), (2), (4) Date: Jan. 14, 2002

(87) PCT Pub. No.: WO01/06785

PCT Pub. Date: Jan. 25, 2001

Related U.S. Application Data

(60) Provisional application No. 60/143,923, filed on Jul. 14, 1999.

(51) Int. Cl.
*H04N 7/16* (2006.01)
(52) U.S. Cl. .................. 725/30; 726/8; 726/9
(58) Field of Classification Search .......... 711/163, 711/164; 713/201, 202; 715/741–743; 725/25–30; 709/225, 229
See application file for complete search history.

(56) References Cited

U.S. PATENT DOCUMENTS

| | | | |
|---|---|---|---|
| 4,768,229 A | 8/1988 | Benjamin et al. | 380/20 |
| 5,236,199 A | 8/1993 | Thompson, Jr. | 273/439 |
| 5,475,585 A | 12/1995 | Bush | 364/401 |
| 5,561,709 A | 10/1996 | Remillard | 379/96 |
| 5,594,227 A | 1/1997 | Deo | 235/380 |
| 5,638,113 A | 6/1997 | Lappington et al. | 348/12 |
| 5,719,387 A | 2/1998 | Fujioka | 235/492 |
| 5,721,583 A | 2/1998 | Harada et al. | 348/12 |
| 5,768,539 A | 6/1998 | Metz et al. | 395/200.79 |
| 5,815,297 A | 9/1998 | Ciciora | 359/146 |
| 5,821,983 A | 10/1998 | Weiss | 348/14 |
| 5,852,290 A | 12/1998 | Chaney | 235/492 |
| 5,886,730 A | 3/1999 | Tsosie | 348/5.5 |
| 5,933,498 A | 8/1999 | Schneck et al. | |

(Continued)

FOREIGN PATENT DOCUMENTS

GB 2290407 12/1995

(Continued)

OTHER PUBLICATIONS

Patent Abstracts of Japan, vol. 012, No. 080, Mar. 12, 1988 & JP 62-217787.

*Primary Examiner*—Andrew Y Koenig
*Assistant Examiner*—Mark D Featherstone
(74) *Attorney, Agent, or Firm*—Robert D. Shedd; Paul P. Kiel

(57) ABSTRACT

A method and apparatus for controlling access to programing that is available from multiple programming sources. One embodiment is an integrated terrestrial and satellite television system having a single password set such that a user can enter a single password to activate both satellite and terrestrial television components of the system.

19 Claims, 3 Drawing Sheets

U.S. PATENT DOCUMENTS 6,104,908 A * 8/2000 Schaffner et al. ............. 725/78
6,160,545 A * 12/2000 Eyer et al. .................. 715/721
6,519,412 B1 * 2/2003 Kim ............................ 386/94
2003/0079227 A1 * 4/2003 Knowles et al. ............... 725/50

FOREIGN PATENT DOCUMENTS

| JP | 62-217787 | 9/1987 |
| WO | 98/43427 | 10/1998 |
| WO | 99/44361 | 9/1999 |

* cited by examiner

METHOD AND APPARATUS FOR USING A SINGLE PASSWORD SET IN AN INTEGRATED TELEVISION SYSTEM

This application claims the benefit under 35 U.S.C. § 365 of International Application PCT/US00//18950, filed Jul. 12, 2000, which was published in accordance with PCT Article 21(2) on Jan. 25, 2001 in English; and which claims benefit of U.S. provisional application Ser. No. 60/143,923 filed Jul. 14, 1999.

FIELD OF THE INVENTION

The invention generally relates to a television receiver system. More particularly, the invention relates to password utilization in a television system capable of receiving signals from multiple sources.

DESCRIPTION OF THE PRIOR ART

Traditionally, television viewers have used over-the-air or cable television (terrestrial television) as their primary source of programming. With the emergence of the widespread use of a V-chip and other digital television technologies that control access to programming, many terrestrial television systems are using passwords to limit the access to particular channels or to make service purchases (e.g., pay per view movies). In addition, some television viewers use satellite television systems to obtain various programs or channels from a satellite television provider.

Most satellite television systems utilize passwords for limiting the access to various content material and services. The access level is defined by the level of services to which a viewer has subscribed. To store passwords and facilitate access to the satellite television system, these satellite television systems comprise a satellite set top box (STB) having a smart card interface and an access card, i.e., a smart card. The passwords are used for limiting access to channel viewing lists, purchasing limits on pay per view data, viewing hours and ratings exception handling. In many instances, a television viewer has the capability, through separate systems, to receive both terrestrial and satellite television programming. As such, the viewer that owns a television comprising a V-chip and subscribes to satellite programs is required to use separate satellite system and terrestrial system passwords for accessing the respective satellite and terrestrial television programming. This dual password utilization is not consumer friendly.

Therefore, there is a need for dynamically linking the satellite and terrestrial password systems such that only the passwords from one of these television systems are utilized to enable access to both systems.

SUMMARY OF THE INVENTION

The invention provides a method and apparatus for enabling conditional access to programming that is available from multiple sources of programming. One embodiment of the invention is an integrated terrestrial and satellite television system having a single password set such that a user can enter a single password to activate both satellite and terrestrial television components of the system. The integrated television system comprises both a terrestrial television receiver and a satellite television receiver. The terrestrial television receiver utilizes password access (terrestrial passwords) to programming in accordance with the use of a V-chip and the satellite receiver utilizes password access to satellite programming (satellite passwords).

The integrated password access is facilitated by a smart card and smart card interface. When no smart card is used or an incorrect smart card is used, the integrated system defaults to using the terrestrial television passwords to access terrestrial programming and no access to satellite programming are permitted. When a correct smart card is inserted into the integrated system, the master password of satellite television system overwrites the terrestrial password. As such, a single master password is now used to access both terrestrial television programming and satellite television programming.

BRIEF DESCRIPTION OF THE DRAWINGS

To facilitate understanding, identical reference numerals have been used, where possible, to designate identical elements that are common to the figures.

DETAILED DESCRIPTION

Figure 1:
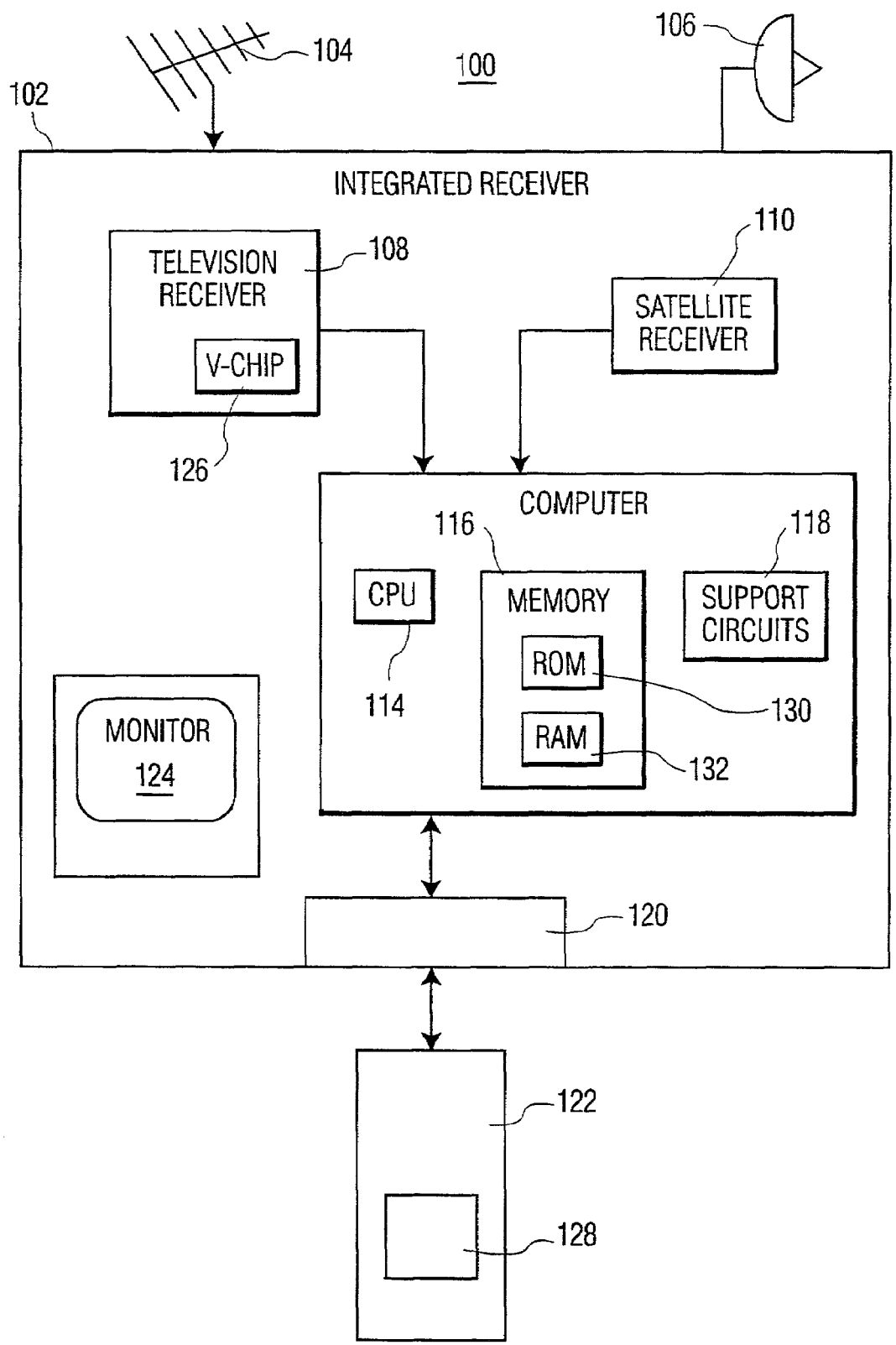
FIG. 1 depicts a high-level block diagram of an integrated television system.

FIG. 1 depicts a high-level block diagram of an integrated television system 100 that is capable of receiving television signals from a plurality of sources. The integrated television system 100 comprises an integrated receiver 102 for receiving and processing both terrestrial television signals and satellite television signals. As such, the system 100 receives signals from both a satellite antenna 106 and a terrestrial antenna 104. The signals from the antennas 106 and 104 are separately processed respectively by a satellite television receiver 110 and a terrestrial television receiver 108. The received signals from either source are displayed on a monitor 124 that may be "built-in" to the system 100 or may be separate device. If the monitor 124 is a separate device, then the integrated system 100 is generally referred to as a "set top box".

The system 100 uses a single programming access process to facilitate selective access to programming from both the satellite television receiver 110 and a terrestrial television receiver 108. Programming display is controlled by the computer 112 interacting with a smart card interface 120 and a smart card 122. The computer 112 (a smart card interface controller) comprises a central progressing unit (CPU) 114, a memory 116 and support circuits 118. The CPU 114 is conventionally supported by the memory 116 and the support circuits 118. The support circuits 118 are well known in the computer art as clocks, power supplies, cache, and the like. The memory 116 may be random access memory (RAM) and/or read only memory (ROM). In the context of password access, the smart card 122 comprises ROM 128 for storing passwords that are used in programming access. The passwords in ROM 128 are copied to RAM 116 within the computer 112 when the card is inserted into the interface 120.

When the integrated television system 100 is shipped from the factory, a smart card is shipped with the system. To facilitate activation of a satellite television service, the card is "paired" with the integrated system 100. To pair the card, the card is inserted into the interface and a signal is sent to the system via a satellite transmission. A unique serial number is then written to the ROM 128 in the card 122 to match a serial number for the integrated system 100 such that the paired card only operates with that particular system.

Each of the satellite and terrestrial television receivers 110 and 108 utilize separate passwords or "password sets." At any given time, the system 100 may utilize the password set of either the satellite or terrestrial television receivers 108 and 110. In one embodiment of the invention, the satellite television password access process overrides the password access process of the television receiver to allow a single password to control both the terrestrial and satellite programming access.

The television receiver 108 includes hardware that controls television programming access. One example of such hardware is a V-chip controller 126 but could also include other forms of conditional access such as cable television descrambling privileges. The V-chip controller 126 enables terrestrial programming access with respect to one or more user profiles or accounts. Each of these user profiles or accounts contain passwords (terrestrial passwords) for enabling access to particular content level of programming, for example, PG-13 rated channels or programs.

The terrestrial passwords that control access to programming using the V-chip controller 126 are stored within the television read only memory (ROM) 130 and are written to random access memory (RAM) 132 upon the television being activated. Alternatively, the television may utilize a smart card for storing the terrestrial passwords that are then written to the television's RAM upon insertion of the smart card into the television. These terrestrial passwords are used whenever a satellite smart card is not inserted into the system 100. Upon receiving a terrestrial password for a corresponding user profile, the controller enables the integrated receiver 102 to display the terrestrial programming that is enabled under that particular user profile.

The integrated receiver 102 includes an interface 120 for receiving an access card or smart card 122. The smart card 122 comprises a system specific code (system serial number) to activate a particular system 100 i.e., for discussion, the card is assumed to be paired with the system 100. As such, the satellite receiver portion of the system 100 operates only after a paired smart card 110 is inserted into the interface 120. Upon receipt of the smart card 110 and the user's entering a correct password, the satellite receiver 110 descrambles or enables the receipt of particular content via the satellite antenna 106. The satellite receiver 110 is coupled to the monitor 124 for presenting the received content to a viewer.

The user profiles can be displayed on the monitor 124 as sub-screens to enable a user that enters a master password to initialize other user passwords. For example, a high definition television (HDTV) integrated system may have five user profiles, which includes one master profile and four sub-profiles. Each of the user profiles may have separate passwords. The passwords are cumulatively referred to as a password set. The terrestrial password profiles are stored in the ROM 130 while the satellite passwords are stored in the ROM 128.

Restrictions on the sub-profiles for both terrestrial and satellite access are generally defined after entering the master password. Such restrictions may include access to limited channel viewing lists, purchase limits on pay per view material, limits on viewing hours and restrictions on material above a certain rating limit. In addition, the sub-profiles are optionally locked through the master profile. As such, each sub-profile includes a separate password and is defined or restricted through the master profile.

Figure 2A:
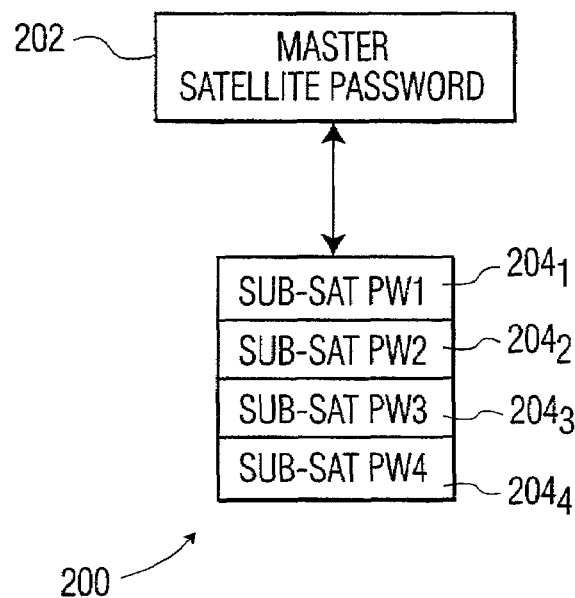
FIG. 2A depicts a password set of the satellite television system.
Figure 2B:
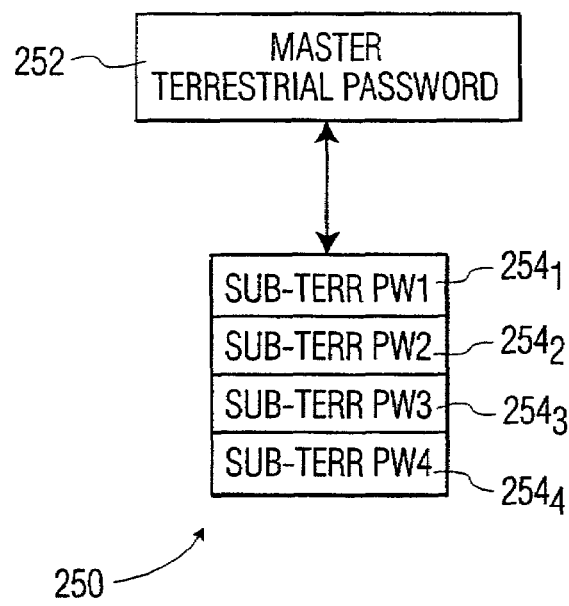
FIG. 2B depicts a password set of the terrestrial television system.

FIG. 2A depicts a password set 200 for the satellite television receiver 110. The password set 200 comprises a master password 202 and four sub-profile passwords $204_1$, $204_2$, $204_3$ and $204_4$. Although four sub-profile passwords are depicted, the password set 200 may comprise any number of sub-profiles. FIG. 2B depicts a password set 250 of the terrestrial television receiver 108 e.g., passwords for the V-chip controller 126. As with the password set 200, the password set 250 may comprise a master password 252 and four sub-profile passwords $254_1$, $254_2$, $254_3$ and $254_4$. The password set 200 of the satellite receiver may have a different number of sub-passwords than the password set 250 of the terrestrial receiver. However, as described below, the integrated television system 100 of the present invention utilizes only one of these password sets 200 and 250 at any given time.

Figure 3:
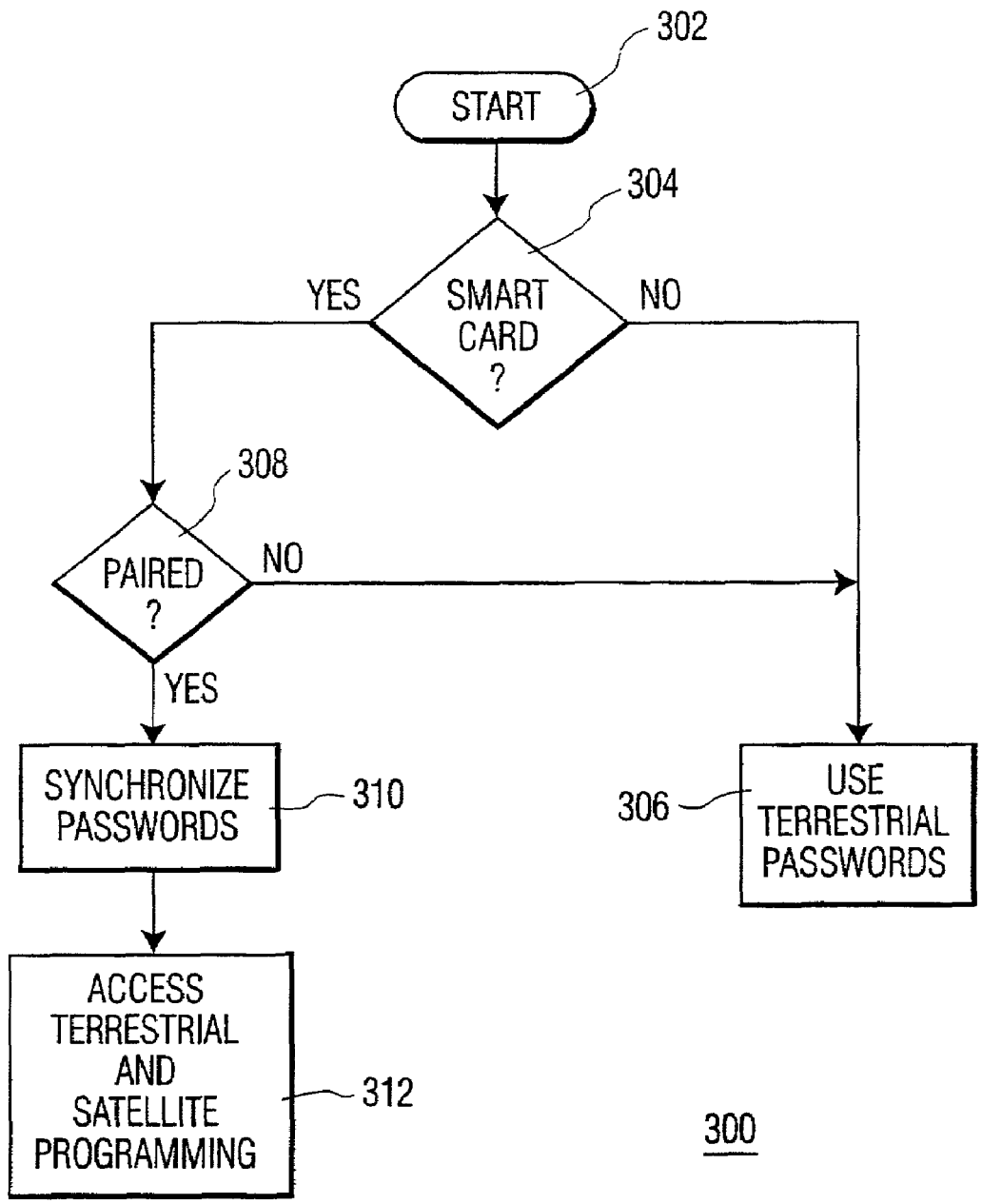
FIG. 3 depicts a flow chart of a routine for implementing a single password system.

FIG. 3 depicts a flow diagram of a routine 300 for implementing a single password system as embodied in the invention. The integrated system 100 may include a software module or program stored in memory 116 that when executed by CPU 114 implements routine 300. As both the satellite and terrestrial television receivers have passwords, the routine 300 uses only one of the password sets 200 and 250 associated with one of these television receivers. If the correct (paired) smart card 122 is inserted in interface 120, then the routine 300 uses the satellite receiver passwords 200 for both satellite and terrestrial television programming access. If the smart card 122 is not inserted in the interface 120 or an inactive (unpaired) card is inserted, then the routine 300 uses the terrestrial receiver passwords 250 in a conventional manner to provide terrestrial programming only to a viewer.

After the routine 300 starts at step 302, the routine 300 proceeds to step 304, to determine whether the smart card 122 is inserted into the interface 120. If the smart card 122 is not inserted, then the routine 300 proceeds to step 306. Alternatively, if the smart card 122 is inserted into the interface 120, then the routine 300 proceeds to step 308.

At step 306, the routine 300 uses the terrestrial television receiver passwords 250 in a conventional manner to permit access to terrestrial programming using a V-chip. In this case, the routine 300 precludes the use of the satellite passwords 200. However, if the system 100 receives the smart card 122 at a later time, then the routine 300 starts over at step 302.

At step 308, the routine 300 determines whether the smart card 122 is "paired" to the system 100, i.e., does the card serial number match the system serial number.

If the smart card 122 is not paired to the system 100, the routine 300 proceeds to step 306. As such, the routine 300 precludes use of the satellite passwords 200 on that system 100. On the other hand, if the smart card 122 is paired to the system 100, the routine 300 proceeds to step 310.

At step 310, the routine 300 synchronizes and/or links the satellite passwords 200 to the terrestrial passwords 250. Synchronization is performed by writing the satellite passwords over the terrestrial passwords in RAM 116. As such, the user can enter a satellite password to access both the terrestrial and satellite programming. The routine 300 proceeds to step 312, where the routine 300 uses the satellite system passwords 200 for all programming access as well as sub-profile alteration.

Consequently, the present invention provides a method for simplifying a viewer's access to television programming that programming arrives from various password controlled sources.

Although various embodiments which incorporate the teachings of the present invention have been shown and described in detail herein, those skilled in the art can readily devise many other varied embodiments that still incorporate these teachings.

What is claimed is:

1. Apparatus for integrating passwords for accessing programming from multiple programming providers, the apparatus comprising:

a memory for storing a first password associated with a first programming provider that directly delivers programming to the apparatus via a first transmission media;

removable memory storing a second password associated with a second programming provider that directly delivers programming to the apparatus via a second transmission media distinct from the first transmission media;

temporary memory temporarily storing said first password during use; and means for replacing, responsive to an insertion of the removable memory, said first password in said temporary storage with said second password to enable said apparatus to allow access to programming from said first and second programming providers, wherein the apparatus is disposed locally with respect to a consumption location of the programming by a user.

2. The apparatus of claim 1 wherein the first and second password each comprise a master password.

3. The apparatus of claim 2 wherein the first password and second password each further comprises a sub-profile password.

4. The apparatus of claim 1 wherein said removable memory is a smart card.

5. The method of claim 4 wherein each of the first and second passwords each comprises a master password.

6. The method of claim 5 wherein at least one of the first and second passwords further comprises a sub-profile password.

7. The apparatus of claim 1, further comprising:
a first antenna for receiving signals from the first programming provider via the first transmission media; and
a second antenna for receiving signals from the second programming provider via the second transmission media.

8. The apparatus of claim 1, wherein the first transmission media comprises a satellite network and the second transmission media comprises a terrestrial network.

9. A method for accessing programming from multiple programming providers in an integrated television system, the method comprising:
determining whether an access card is coupled to the integrated television system;
if said access card is coupled to the integrated television system, processing a first password received from said access card to access programming directly delivered by said multiple programming providers to the integrated television system via different transmission media such that each of the multiple programming providers uses a respective different one of the different transmission media to directly deliver the programming to the integrated television system; and
if said access card is not coupled to the integrated television system, processing a second password to access at least some of the programming delivered to the integrated television system via at least one of the transmission media and precludes access to programming delivered to the integrated television system via at least one other of the transmission media.

10. The method of claim 9 further comprising writing said second password to temporary storage for use when the access card is not coupled to the integrated television system; and
overwriting said second password in temporary storage with said first password when said access card is coupled to the integrated television system.

11. The method of claim 9 further comprising validating said access card before using said first password.

12. The method of claim 9, further comprising:
receiving signals from a first antenna corresponding to a first of said multiple programming providers; and,
receiving signals from a second antenna corresponding to a second of said multiple programming providers.

13. The apparatus of claim 9, wherein the first password is a master password associated with a satellite transmission media and the second password is a master password associated with a terrestrial transmission media.

14. A television apparatus, comprising:
a receiver configurable to directly receive programming from first and second programming providers via a first transmission media and a second transmission media distinct from the first transmission media, respectively;
processing circuits, coupled to the receiver, that process television signals received by the receiver and provide output signals;
an access card interface for receiving an access card;
a controller, coupled to the access card interface, that determines whether the access card is coupled to the access card interface; and
a memory for storing a first password associated with the first programming provider, wherein the controller, upon determining that the access card is not coupled to the access card interface, causes the processing circuits to use the first password to access programming from the first programming provider, and upon determining that the access card is coupled to the access card interface, downloads a second password from the access card and causes the processing circuits to use the second password to access programming from both the first and second programming providers.

15. The apparatus of claim 14, wherein the first and second passwords each comprise a master password.

16. The apparatus of claim 15, wherein the first and second passwords each further comprises a sub-profile password.

17. The apparatus of claim 14, wherein the access card comprises a smart card.

18. The apparatus of claim 14, wherein programming associated with the first programming provider is directly received via a cable connection, and programming associated with the second programming provider is directly received via an over the air transmission.

19. The apparatus of claim 14, wherein the receiver receives programming from the first programming provider via a satellite network, and the receiver receives programming from the second programming provider via a terrestrial network.

* * * * *